United States Patent
Wang et al.

(10) Patent No.: US 10,499,297 B2
(45) Date of Patent: Dec. 3, 2019

(54) METHOD FOR HANDOVER BETWEEN DISTRIBUTED ACCESS POINTS AND RELATED DEVICE

(71) Applicant: Huawei Technologies Co., Ltd., Shenzhen (CN)

(72) Inventors: Yungui Wang, Nanjing (CN); Liyun Ou, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 15/663,404

(22) Filed: Jul. 28, 2017

(65) Prior Publication Data

US 2018/0035338 A1 Feb. 1, 2018

(30) Foreign Application Priority Data

Jul. 29, 2016 (CN) .......................... 2016 1 0614018

(51) Int. Cl.
*H04W 36/08* (2009.01)
*H04W 36/38* (2009.01)
(Continued)

(52) U.S. Cl.
CPC ........ *H04W 36/08* (2013.01); *H04W 36/0011* (2013.01); *H04W 36/24* (2013.01);
(Continued)

(58) Field of Classification Search
CPC . H04W 36/08; H04W 36/0011; H04W 36/24; H04W 36/38; H04W 36/023; H04W 36/0033; H04W 84/12; H04W 88/08
See application file for complete search history.

(56) References Cited

U.S. PATENT DOCUMENTS 6,947,399 B1 * 9/2005 Sen ....................... H04W 28/26
370/331
8,934,437 B2 1/2015 Li et al.
(Continued)

FOREIGN PATENT DOCUMENTS

CN 101193440 A 6/2008
CN 1921696 B 7/2012
(Continued)

OTHER PUBLICATIONS

Mino et al., "Cooperation schemes validation," IST-4-027756 Winner II D4.8.2 v1.0, XP002476315, Information Society Technologies (Jun. 30, 2007).
(Continued)

*Primary Examiner* — Ivan O Latorre
(74) *Attorney, Agent, or Firm* — Leydig, Voit & Mayer, Ltd.

(57) ABSTRACT

According to a method for handover between distributed access points, an AP 1 receives a handover request sent by a central AP, where the handover request includes an address of a wireless terminal and an identifier of an AP 2; and after receiving the handover request, the AP 1 sends a context handover request to the AP 2, where the context handover request includes an unsent frame of the wireless terminal. In a handover process, the AP 1 may send, to the AP 2, a buffered frame that fails to be sent to the wireless terminal in time, and send the frame to the wireless terminal by using the AP 2, so as to reduce a downlink packet loss when the wireless terminal is handed over between the AP 1 and the AP 2.

10 Claims, 6 Drawing Sheets

(51) Int. Cl.
  *H04W 36/24* (2009.01)
  *H04W 36/00* (2009.01)
  *H04W 84/12* (2009.01)
  *H04W 88/08* (2009.01)
  *H04W 36/02* (2009.01)

(52) U.S. Cl.
  CPC ........ *H04W 36/38* (2013.01); *H04W 36/0033* (2013.01); *H04W 36/023* (2013.01); *H04W 84/12* (2013.01); *H04W 88/08* (2013.01)

(56) References Cited

U.S. PATENT DOCUMENTS

| | | | |
|---|---|---|---|
| 2007/0049345 | A1 | 3/2007 | Sao et al. |
| 2007/0072612 | A1* | 3/2007 | Haraguchi ............ H04W 36/02 455/436 |
| 2008/0192696 | A1 | 8/2008 | Sachs et al. |
| 2010/0248726 | A1* | 9/2010 | Kagimoto ............ H04W 36/02 455/437 |
| 2010/0260103 | A1 | 10/2010 | Guey et al. |
| 2012/0202502 | A1* | 8/2012 | Wu ........................ H04W 8/12 455/436 |

FOREIGN PATENT DOCUMENTS

| | | |
|---|---|---|
| CN | 104254110 A | 12/2014 |
| CN | 104285471 A | 1/2015 |
| CN | 102045693 B | 5/2015 |
| EP | 2480011 A1 | 7/2012 |
| EP | 2482585 A1 | 8/2012 |
| JP | 2007089141 A | 4/2007 |
| JP | 2009503991 A | 1/2009 |
| JP | 2015520564 A | 7/2015 |

OTHER PUBLICATIONS

"Part 11: Wireless LAN Medium Access Control (MAC) and Physical Layer (PHY) Specifications; Amendment 2: Fast Basic Service Set (BSS) Transition," IEEE Computer Society, IEEE Std 802.11-2008, Institute of Electrical and Electronics Engineers, New York, New York (Jul. 15, 2008).

* cited by examiner

METHOD FOR HANDOVER BETWEEN DISTRIBUTED ACCESS POINTS AND RELATED DEVICE

CROSS-REFERENCE TO RELATED APPLICATIONS

This application claims priority to Chinese Patent Application No. 201610614018.X, filed on Jul. 29, 2016, which is hereby incorporated by reference in its entirety.

TECHNICAL FIELD

The present invention relates to the field of communications technologies, and in particular, to a method for handover between distributed access points, and a related device.

BACKGROUND

When a wireless terminal in a wireless local area network (WLAN) moves, the wireless terminal is handed over between access points (AP). The handover means that when the wireless terminal moves from a coverage area of one access point to a coverage area of another access point, the wireless terminal connects to the latter access point instead of connecting to the former access point. In a handover process of the wireless terminal, a central access point may immediately forward, to the latter access point instead of the former access point, a newly received packet that is to be sent to the wireless terminal. However, in this case, the former access point may still have some buffered packets that fail to be sent to the wireless terminal in time, and consequently, a downlink packet loss is caused. Herein, a packet sent by a distributed access point to the wireless terminal is referred to as a downlink packet, and a packet sent by the wireless terminal to the distributed access point is referred to as an uplink packet. If a lost downlink packet is a voice service packet, transient loss of voice occurs. If a lost downlink packet is a video service packet, transient frame freezing and artifacts appear. Consequently, user experience is reduced.

SUMMARY

This application is to provide an improved handover method.

A first aspect provides a method for handover between different distributed access points in a same mobility domain (that is, between the different distributed access points are managed and controlled by a same central access point). A first distributed access point receives a handover request sent by a central access point, where the handover request includes an address of a wireless terminal and an identifier of a second distributed access point. After receiving the handover request, the first distributed access point sends a context handover request to the second distributed access point, where the context handover request includes an unsent frame of the wireless terminal, the unsent frame is a frame that has not been sent to the wireless terminal among frames of the wireless terminal that are stored in the first distributed access point, and the context handover request is used to instruct the second distributed access point to send the unsent frame to the wireless terminal.

In this technical solution, in a process in which the wireless terminal moves from a coverage area of the first distributed access point to a coverage area of the second distributed access point, the first distributed access point may send, to the second distributed access point, a buffered frame that fails to be sent to the wireless terminal in time, and the second distributed access point sends the frame to the wireless terminal, so as to reduce a downlink packet loss when the wireless terminal is handed over between the first distributed access point and the second distributed access point.

In a first possible implementation manner of the first aspect, the first distributed access point may further receive a first Ethernet frame sent by the central access point, where a destination address of the first Ethernet frame is the address of the wireless terminal; the first distributed access point saves the first Ethernet frame, where the frames of the wireless terminal that are stored in the first distributed access point include the first Ethernet frame, or the first distributed access point converts the first Ethernet frame into a first radio frame, and saves the first radio frame, where the frames of the wireless terminal that are stored in the first distributed access point include the first radio frame; and the first distributed access point sends a first instruction to the central access point when a storage volume of the first distributed access point is greater than a threshold, where the first instruction includes the address of the wireless terminal, and the first instruction is used to instruct the central access point to decrease a rate of sending an Ethernet frame of the wireless terminal.

The first distributed access point sends the unsent frame, that is, the buffered frame that fails to be sent to the wireless terminal in time, to the second distributed access point, and the second distributed access point sends the frame to the wireless terminal. The unsent frame needs to pass through the second distributed access point, and consequently, a downlink packet delay of the wireless terminal is increased while a downlink packet loss of the wireless terminal is reduced. Therefore, to reduce the downlink packet delay of the wireless terminal as much as possible, a quantity of frames stored on the distributed access point needs to be controlled as much as possible, so that when the first distributed access point receives the handover request, a small quantity of frames of the wireless terminal are stored on the first distributed access point, that is, a quantity of downlink packets that require detouring is reduced.

With reference to the first possible implementation manner of the first aspect, in a second possible implementation manner, the first instruction is further used to instruct the central access point to save a second Ethernet frame whose destination address is the address of the wireless terminal. The first distributed access point may further receive a context handover acknowledgment sent by the second distributed access point, where the context handover acknowledgment is an acknowledgment of the second distributed access point for the context handover request. The first distributed access point sends a handover acknowledgment to the central access point in response to the context handover acknowledgment, where the handover acknowledgment is used to instruct the central access point to start to send the second Ethernet frame stored in the central access point to the second distributed access point.

If the central access point receives the handover acknowledgment sent by the first distributed access point, it indicates that the first distributed access point has completed sending of the unsent frame. The central access point sends the stored second Ethernet frame to the second distributed access point only after receiving the handover acknowledgment. Therefore, out-of-order of downlink packets can be reduced.

With reference to the first or the second possible implementation manner of the first aspect, in a third possible implementation manner, after receiving the handover request sent by the central access point, the first distributed access point may further preferentially send the frames of the wireless terminal that are stored in the first distributed access point to the wireless terminal.

The first distributed access point sends the unsent frame, that is, the buffered frame that fails to be sent to the wireless terminal in time, to the second distributed access point, and the second distributed access point sends the frame to the wireless terminal. The unsent frame needs to pass through the second distributed access point, and consequently, a downlink packet delay of the wireless terminal is increased while a downlink packet loss of the wireless terminal is reduced. Therefore, to reduce the downlink packet delay of the wireless terminal as much as possible, the first distributed access point preferentially sends a frame of the wireless terminal after receiving the handover request, so as to reduce a quantity of unsent frames, that is, reduce a quantity of downlink packets that require detouring.

With reference to the third possible implementation manner of the first aspect, in a fourth possible implementation manner, the method further includes:

if it is detected that a transmission rate of a successfully sent frame among the stored frames of the wireless terminal is less than a first threshold, stopping sending, by the first distributed access point, the frames of the wireless terminal that are stored in the first distributed access point to the wireless terminal; or if it is detected that received signal strength of an acknowledgment frame of a successfully sent frame among the stored frames of the wireless terminal is less than a second threshold, stopping sending, by the first distributed access point, the frames of the wireless terminal that are stored in the first distributed access point to the wireless terminal; or if sending of a frame to the wireless terminal fails, stopping sending, by the first distributed access point, the frames of the wireless terminal that are stored in the first distributed access point to the wireless terminal.

A second aspect provides another method for handover between different distributed access points in a same mobility domain. A central access point receives a first instruction sent by a first distributed access point, where the first instruction includes an address of a wireless terminal, and the first distributed access point is a distributed access point in multiple distributed access points that serves the wireless terminal. The central access point decreases, in response to the first instruction, a rate of sending an Ethernet frame of the first distributed access point, and saves the Ethernet frame. When the wireless terminal is handed over from the first distributed access point to a second distributed access point, the central access point sends the Ethernet frame to the second distributed access point, and sends a handover request to the first distributed access point, where the handover request includes the address of the wireless terminal and an identifier of the second distributed access point, the handover request is used to instruct the first distributed access point to send an unsent frame of the wireless terminal to the second distributed access point, and the unsent frame is a frame that has not been sent to the wireless terminal among frames of the wireless terminal that are stored in the first distributed access point.

When the wireless terminal is handed over from the first distributed access point to the second distributed access point, the central access point instructs the first distributed access point to send the unsent frame to the wireless terminal by using the second distributed access point, so as to reduce a downlink packet loss when the wireless terminal is handed over between the first distributed access point and the second distributed access point. The unsent frame needs to pass through the second distributed access point, and consequently, a downlink packet delay of the wireless terminal is increased while a downlink packet loss of the wireless terminal is reduced. Therefore, to reduce the downlink packet delay of the wireless terminal as much as possible, the central access point decreases a rate of sending the Ethernet frame, to control a quantity of frames stored on a distributed access point. After the handover, the central access point sends the stored Ethernet frame to the second distributed access point, and the second distributed access point sends the Ethernet frame to the wireless terminal.

In a first possible implementation manner of the second aspect, the sending the Ethernet frame to the second distributed access point includes:

sending, by the central access point, the Ethernet frame to the second distributed access point after the access point receives a handover acknowledgment sent by the first distributed access point, where the handover acknowledgment is an acknowledgment for the handover request after the first distributed access point sends the unsent frame of the wireless terminal to the second distributed access point.

If the central access point receives the handover acknowledgment sent by the first distributed access point, it indicates that the first distributed access point has completed sending of the unsent frame. The central access point sends a stored second Ethernet frame to the second distributed access point only after receiving the handover acknowledgment. Therefore, out-of-order of downlink packets can be reduced.

With reference to the second aspect or the first possible implementation manner of the second aspect, in a second possible implementation manner, the central access point may further receive a context handover request sent by the first distributed access point, where the context handover request includes the unsent frame of the wireless terminal, the unsent frame is a frame that has not been sent to the wireless terminal among the frames of the wireless terminal that are stored in the first distributed access point; and the central access point forwards the context handover request to the second distributed access point.

A third aspect provides a distributed access point. The distributed access point includes a processor, a memory, and a network interface. The network interface includes a wireless interface. Optionally, the network interface may further include a wired interface. The distributed access point may be connected to a central access point in a wired manner by using the wired interface to receive/send messages involved in the foregoing methods from/to the central access point. Alternatively, the distributed access point may be connected to the central access point by using the wireless interface to receive/send messages involved in the foregoing methods from/to the central access point. The distributed access point performs wireless communication with a wireless terminal by using the wireless interface. The processor is configured to perform some or all procedures in the first aspect.

A fourth aspect provides another distributed access point. The distributed access point includes a processing module, a sending module, and a receiving module. The distributed access point implements some or all methods in the first aspect by using the foregoing modules.

A fifth aspect provides a computer storage medium. The computer storage medium stores a program, and the program performs some or all steps in the first aspect.

A sixth aspect provides a central access point. The central access point includes a processor, a memory, and a network interface. The processor is connected to the memory and the network interface. For example, the processor may be connected to the memory and the network interface by using a bus. The network interface includes one or more Ethernet interfaces. If the network interface includes one Ethernet interface, the central access point may be connected to a switching device by using the Ethernet interface. One or more network interfaces of the switching device are connected to a distributed access point in a wired manner to receive/send messages involved in the foregoing methods from/to the distributed access point. A remaining network interface of the switching device is connected to another network device in a wired manner to receive an Ethernet frame sent by the another network device. If the network interface includes multiple Ethernet interfaces, one or more Ethernet interfaces in the multiple Ethernet interfaces are connected to a distributed access point in a wired manner to receive/send messages involved in the foregoing methods from/to the distributed access point. A remaining network interface in the multiple Ethernet interfaces is connected to another network device in a wired manner to receive an Ethernet frame sent by the another network device. The processor is configured to perform some or all procedures in the second aspect.

A seventh aspect provides another central access point. The central access point includes a processing module, a sending module, and a receiving module. The central access point implements some or all methods of the second aspect by using the foregoing modules.

An eighth aspect provides a computer storage medium. The computer storage medium stores a program, and the program performs some or all steps in the second aspect.

BRIEF DESCRIPTION OF DRAWINGS

To describe technical solutions in embodiments of the present invention more clearly, the following briefly introduces the accompanying drawings for describing the embodiments. The accompanying drawings in the following description show some embodiments of the present invention, and a person of ordinary skill in the art may still derive other drawings from these accompanying drawings without creative efforts.

DESCRIPTION OF EMBODIMENTS

Figure 1:
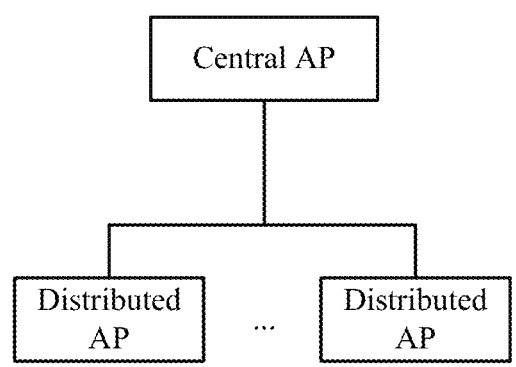
FIG. 1 is a schematic structural diagram of a central distributed architecture according to an embodiment of the present invention.

As shown in FIG. 1, a central distributed architecture includes a central access point and at least two distributed access points. The distributed access point is an access point having a radio frequency function. The central access point may be an access point having a radio frequency function, or may be a network device having no radio frequency function. For more detailed functions of the central access point and the distributed access point, refer to the following description.

The central access point has a function (excluding a radio frequency part) of a conventional access point, and some functions of a radio controller are added to the central access point, such as functions of controlling association for a wireless terminal and handover inside the central access point. In addition, the central access point further has a function of managing the distributed access point. The function of handover inside the central access point refers to a function that enables a wireless terminal to be handed over between different distributed access points controlled by a same central access point. In addition to the foregoing functions, the central access point may further have a broadband service-related function and a service forwarding-related function of the conventional access point, for example, quality of service (QoS) and an access control list (ACL). The foregoing radio controller may be an Access Controller (AC) in the Control And Provisioning of Wireless Access Points (CAPWAP) protocol.

The central access point may further have a function of a gateway. The central access point may further have a network access control (NAC) function and a function of a Dynamic Host Configuration Protocol (DHCP) server.

The distributed access point is a radio frequency module separated from the conventional access point. The distributed access point is responsible for processing an air-interface packet in a WLAN, and communicates with the central access point by using a tunnel of a wired network (for example, the Ethernet). The central access point may communicate with the distributed access point directly or by using the CAPWAP protocol.

A control channel between a Wireless Termination Point (WTP) and an Access Controller is provided in the CAPWAP protocol. In the embodiments of the present invention, when the distributed access point communicates with the central access point by using a CAPWAP tunnel, the central access point is used as the Access Controller in the CAPWAP protocol, and the distributed access point is used as the WTP in the CAPWAP protocol.

The embodiments of the present invention are applicable to a scenario in which a wireless terminal is handed over between different distributed access points controlled by a same central access point. The wireless terminal is any device having a function of a WLAN station (STA), for example, a cell phone, a smartphone, a computer, a tablet computer, a personal digital assistant (PDA), a mobile Internet device (MID), a wearable device, or an e-book reader.

Figure 2A:
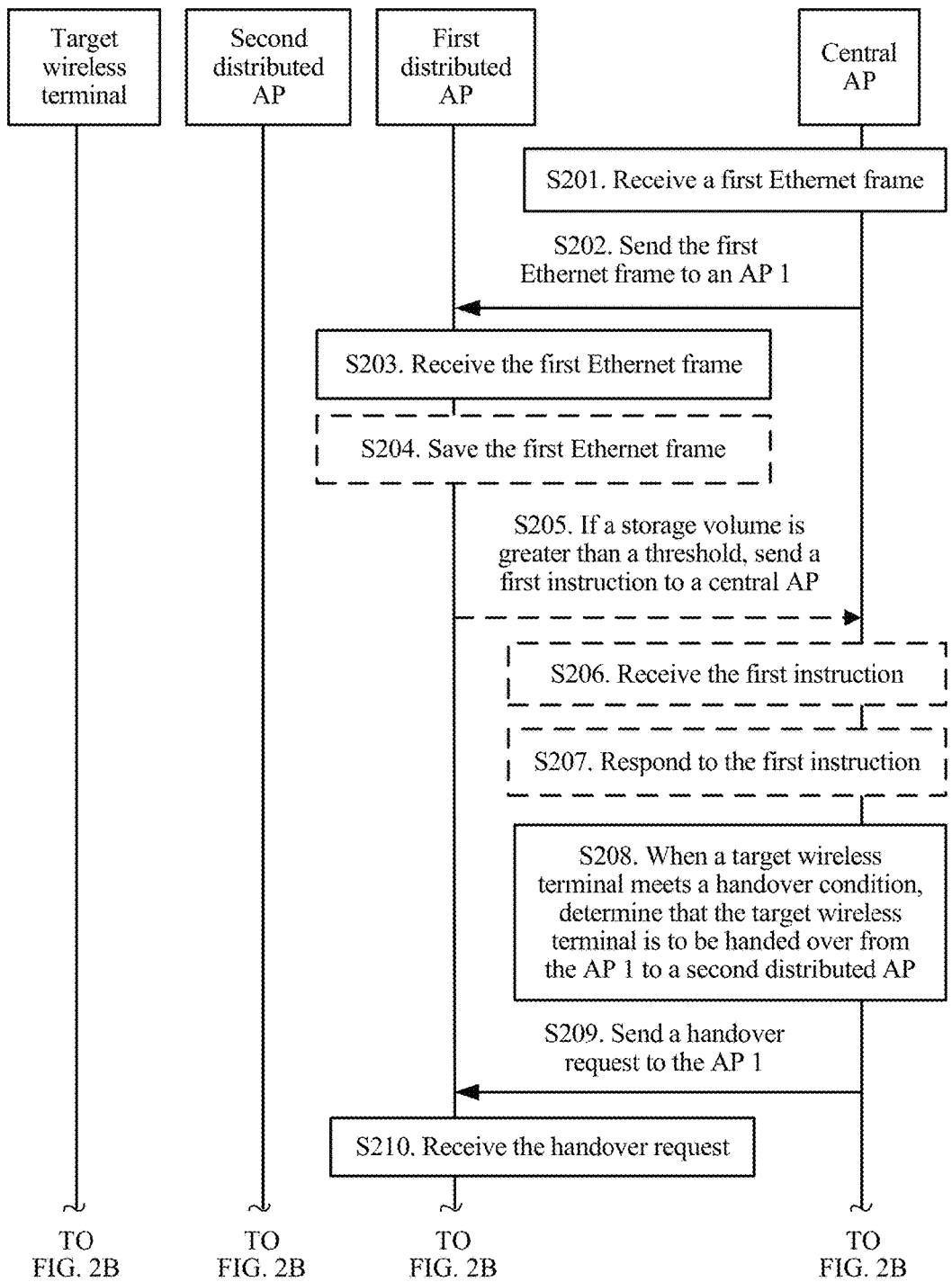
FIG. 2A and FIG. 2B are a schematic flowchart of a method for handover between distributed access points according to an embodiment of the present invention.
Figure 2B:
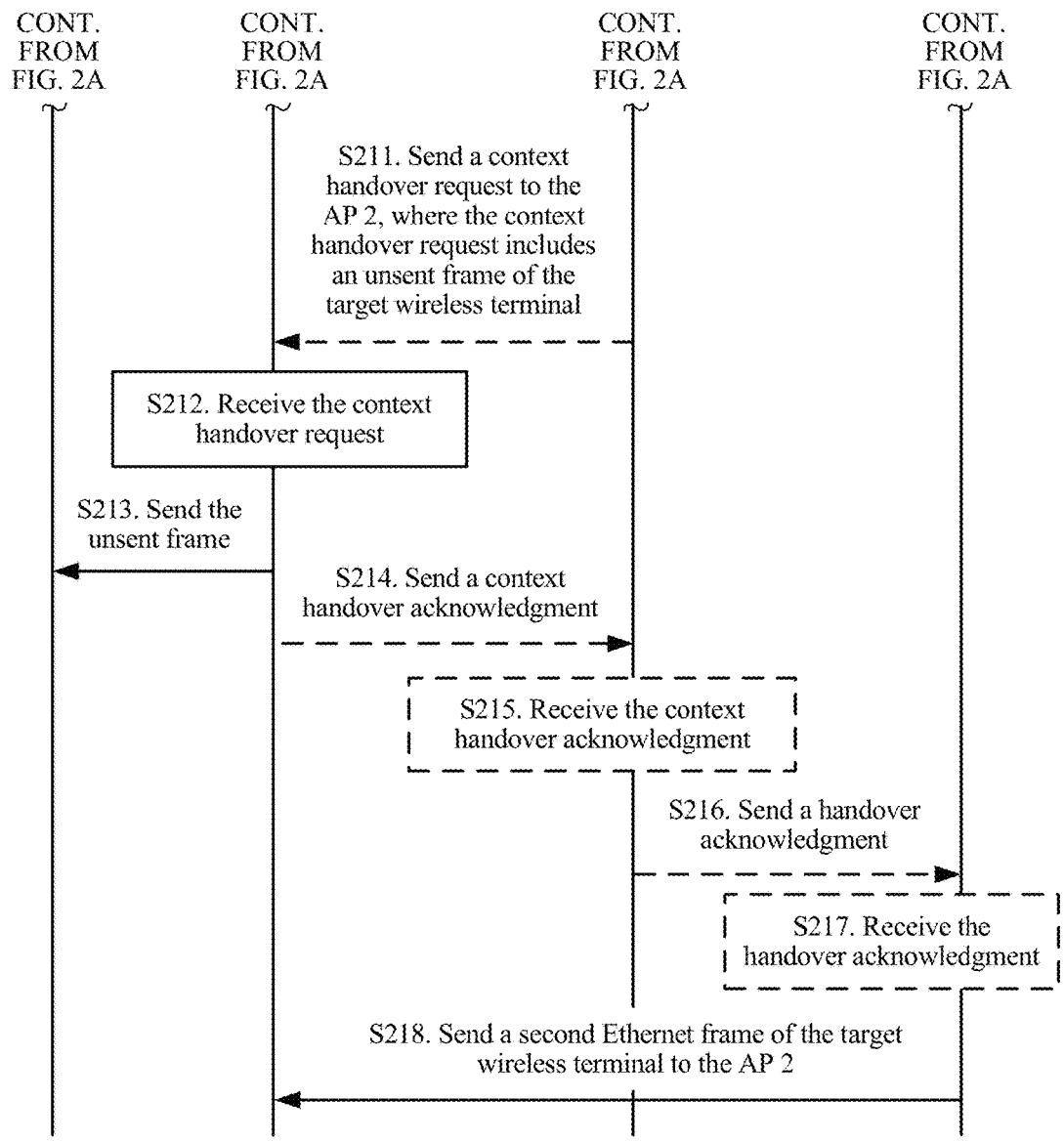

Referring to FIG. 2A and FIG. 2B, FIG. 2A and FIG. 2B are a schematic flowchart of a method for handover between distributed access points according to an embodiment of the present invention. In coverage areas of distributed access points controlled by a same central access point, multiple wireless terminals may be handed over, and the wireless terminals have a same procedure of handover between distributed access points. Therefore, one of the wireless terminals, that is, a target wireless terminal, is used as an example for description in this embodiment of the present invention. As shown in FIG. 2A and FIG. 2B, the method includes the following steps.

S201. A central access point receives a first Ethernet frame.

The central access point may receive the first Ethernet frame from another wired network device or a distributed access point. A destination address of the first Ethernet frame is an address of the target wireless terminal, for example, a media access control (MAC) address of the target wireless terminal. The central access point may identify the first Ethernet frame of the target wireless terminal according to the address of the target wireless terminal.

S202. The central access point sends the first Ethernet frame to a first distributed access point (hereinafter referred to as an AP 1).

The AP 1 is a distributed access point that serves the target wireless terminal before the target wireless terminal is handed over.

S203. The AP 1 receives the first Ethernet frame.

S204. Optionally, the AP 1 saves the first Ethernet frame.

The AP 1 may leave a storage area for storing Ethernet frames of multiple wireless terminals, and distinguish Ethernet frames of different wireless terminals according to addresses of the wireless terminals. The AP 1 may directly save the first Ethernet frame after receiving the first Ethernet frame of the target wireless terminal. Alternatively, after converting the first Ethernet frame into a first radio frame, the AP 1 may save the first radio frame.

S205. If a storage volume is greater than a threshold, the AP 1 sends a first instruction to the central access point, where the first instruction includes an address of a target wireless terminal.

Optionally, that the storage volume is greater than the threshold may mean that a volume of stored frames of the target wireless terminal is greater than the threshold. That the volume of frames of the target wireless terminal is greater than the threshold may mean that the quantity of frames of the target wireless terminal is greater than a data threshold, or that a data amount of the frames of the target wireless terminal is greater than a capacity threshold.

Optionally, that the storage volume is greater than the threshold may mean that a total volume of stored frames of all wireless terminals is greater than the threshold. That the total volume of frames of all wireless terminals is greater than the threshold may mean that the total quantity of frames of all the wireless terminals is greater than the data threshold, or that a total data amount of the frames of all the wireless terminals is greater than the capacity threshold. If the total volume of stored frames of all the wireless terminals is greater than the threshold, the first instruction may include addresses of all the wireless terminals or addresses of some wireless terminals.

S206. The central access point receives the first instruction.

S207. The central access point responds to the first instruction.

An operation performed when the central access point responds to the first instruction may be as follows:

The central access point decreases a rate of sending an Ethernet frame of the target wireless terminal. For example, after the central access point receives the first instruction, if a rate of receiving the Ethernet frame of the target wireless terminal is greater than a sending threshold X, the central access point sends the Ethernet frame of the target wireless terminal at a rate X, and saves an unset Ethernet frame. For another example, after receiving the first instruction, the central access point may suspend sending of the Ethernet frame of the target wireless terminal.

The central access point saves a second Ethernet frame whose destination address is the address of the target wireless terminal.

S208. When the target wireless terminal meets a handover condition, the central access point determines that the target wireless terminal is to be handed over from the AP 1 to a second distributed access point (hereinafter referred to as an AP 2).

The AP 2 is a distributed access point that serves the target wireless terminal after the target wireless terminal is handed over.

Figure 3:
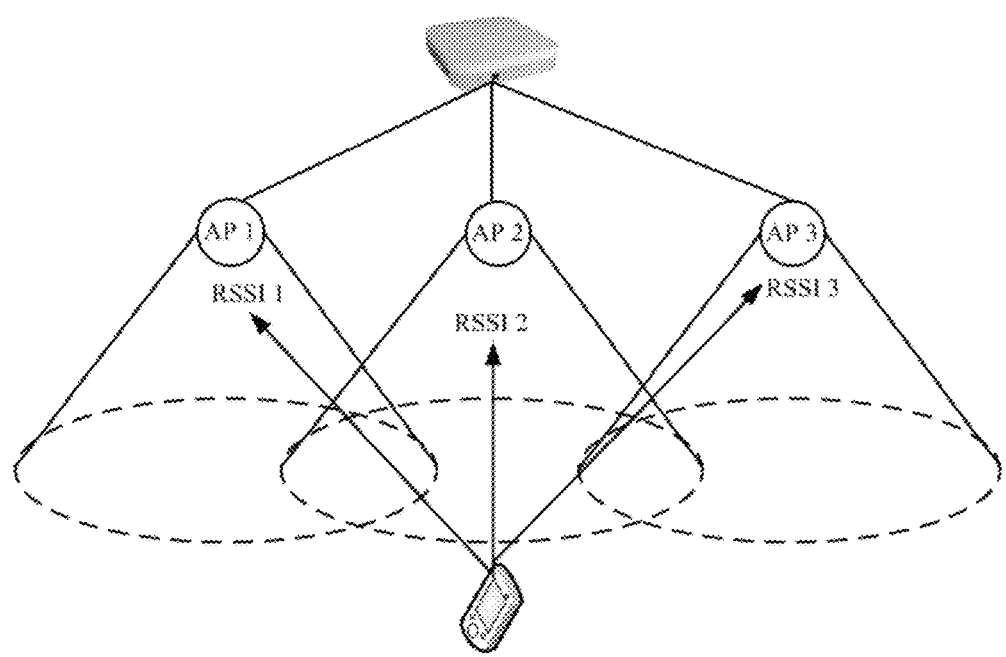
FIG. 3 is a schematic diagram of a handover scenario according to an embodiment of the present invention.

Optionally, the central access point may determine, in real time, whether the target wireless terminal meets the handover condition. As shown in FIG. 3, after the target wireless terminal is connected to a network, a currently-associated distributed access point (for example, the AP 2 in FIG. 3) and neighboring distributed access points (for example, the AP 1 and an AP 3 in FIG. 3) of the currently-associated distributed access point periodically report a received signal strength indication (RSSI) of the target wireless terminal to the central access point at the same time. The central access point determines, based on the RSSIs of the target wireless terminal that are monitored by the distributed access points, whether the handover condition is met. If the handover condition is met, the central access point determines that the target wireless terminal is handed over from the AP 1 to the AP 2.

In some embodiments, the central access point separately compares an RSSI sent by a distributed access point that currently serves the target wireless terminal with an RSSI sent by a neighboring distributed access point of the distribute access point that currently serves the target wireless terminal. If a difference between strength indicated by the RSSI sent by the neighboring distributed access point and strength indicated by the RSSI sent by the distributed access point that currently serves the target wireless terminal reaches a specific threshold, and in a subsequent period of time, the strength indicated by the RSSI sent by the neighboring distributed access point is increasingly high and the strength indicated by the RSSI sent by the distributed access point that currently serves the target wireless terminal is increasingly low, the central access point determines that the handover condition is met. As shown in FIG. 3, it is assumed that an RSSI sent by the AP 2 is an RSSI 2, an RSSI sent by the AP 1 is an RSSI 1, and an RSSI sent by the AP 3 is an RSSI 3. If a difference obtained after subtracting the RSSI 2 from the RSSI 3 reaches a specific threshold, and in a subsequent period of time, strength indicated by the RSSI 3 is increasingly high and strength indicated by the RSSI 2 is increasingly low, the central access point determines that the handover condition is met.

The handover condition may be another combination that can be used for handover determining, for example, the strength indicated by the RSSI sent by the neighboring distributed access point exceeds a specific threshold, and the strength indicated by the RSSI sent by the distributed access point that currently serves the target wireless terminal is less than a specific threshold.

S209. The central access point sends a handover request to the AP 1.

The handover request includes the address of the target wireless terminal, for example, a MAC address of the target wireless terminal, and an identifier of the AP 2, for example, a MAC address or an Internet Protocol (IP) address of the AP 2. The handover request is used to notify the AP 1 that the target wireless terminal is to move out from a coverage area of the AP 1 to a coverage area of the AP 2.

S210. The AP 1 receives the handover request.

Optionally, the AP 1 may send a second instruction to the target wireless terminal.

Optionally, the AP 1 may repeatedly send the second instruction. The second instruction is used to instruct the target wireless terminal to suspend sending of a radio frame.

Optionally, the second instruction may include duration in which suspension of sending of a radio frame is instructed. It is assumed that the duration that is indicated by the second instruction and in which sending of a radio frame is suspended is T. When receiving the second instruction, the target wireless terminal sends a radio frame after a time period T.

S211. The AP 1 sends a context handover request to the AP 2, where the context handover request includes an unsent frame of the target wireless terminal.

The unsent frame is a frame that has not been sent to the target wireless terminal among frames of the target wireless terminal that are stored in the AP 1. If the frames of the target wireless terminal that are stored in the AP 1 are Ethernet frames, the unsent frame of the target wireless terminal is a frame whose destination address is the address of the target wireless terminal. If the frames of the target wireless terminal that are stored in the AP 1 are radio frames, the unsent frame of the target wireless terminal is a frame whose receiver address is the address of the target wireless terminal.

Optionally, after the AP 1 receives the handover request sent by the central access point, the AP 1 may preferentially send the frames of the target wireless terminal that are stored in the AP 1 to the target wireless terminal. After the central access point sends the handover request, an access point that serves the target wireless terminal has changed to the AP 2. However, because the handover occurs just recently, the target wireless terminal may still receive a radio signal of the AP 1. After the handover, the AP 1 may still attempt to send the frames of the target wireless terminal that are stored in the AP 1 to the target wireless terminal. If the AP 1 stores a few frames of the target wireless terminal, the AP 1 may even send all frames of the target wireless terminal in time, and therefore, sending of the context handover request to the AP 2 is avoided. In any case, in order to send as many frames as possible to the target wireless terminal when the target wireless terminal can still receive the radio signal of the AP 1, the AP 1 may preferentially send the frames of the target wireless terminal.

For example, during downlink packet scheduling, the frames of the target wireless terminal may be preferentially sent, that is, the frames of the target wireless terminal are sent before a frame of another wireless terminal is sent. For another example, the AP 1 sends a WLAN frame of the target wireless terminal by using a high-priority access category.

Further optionally, in a process in which the AP 1 preferentially sends the frames of the target wireless terminal that are stored in the AP 1 to the target wireless terminal, if any one or more of the following cases occur, the AP 1 stops sending the frames of the target wireless terminal that are stored in the AP 1 to the target wireless terminal.

Case 1: The AP 1 may detect transmission rates of the stored frames of the target wireless terminal, and stop sending the frames of the target wireless terminal if it is detected that a transmission rate of a successfully sent frame is less than a first threshold (for example, 6 Mbps). It is assumed that the frames of the target wireless terminal that are stored in the AP 1 include five frames {A, B, C, D, E}. The AP 1 sends the frame A to the target wireless terminal and records a transmission rate of the frame A. If an acknowledgment frame replied with by the target wireless terminal is received, it indicates that the frame A is successfully sent. The AP 1 then compares the transmission rate of the frame A with the first threshold, and if the transmission rate of the frame A is less than the first threshold, stops sending the frames of the target wireless terminal and uses {B, C, D, E} as unsent frames of the target wireless terminal.

Case 2: The AP 1 may detect received signal strength of an acknowledgment frame of a successfully sent frame in the stored frames of the target wireless terminal, and stop sending the frames of the target wireless terminal if it is detected that the received signal strength of the acknowledgement frame of the sent frame is less than a second threshold (for example, −70 dBm). It is assumed that the frames of the target wireless terminal that are stored in the AP 1 include five frames {A, B, C, D, E}. The AP 1 sends the frame A to the target wireless terminal. If an acknowledgment frame replied with by the target wireless terminal is received, it indicates that the frame A is successfully sent. The AP 1 obtains received signal strength of the acknowledgment frame, and if the received signal strength of the acknowledgment frame is less than the second threshold, stops sending the frames of the target wireless terminal and uses {B, C, D, E} as unsent frames of the target wireless terminal.

Case 3: The AP 1 may detect whether sending of a frame to the target wireless terminal fails, and stop sending the frames of the target wireless terminal if it is detected that sending of a frame to the target wireless terminal fails. It is assumed that the frames of the target wireless terminal that are stored in the AP 1 include five frames {A, B, C, D, E}. The AP 1 sends the frame A to the target wireless terminal. If no acknowledgment frame replied with by the target wireless terminal is received, it indicates that sending of the frame A fails. The AP 1 stops sending the frames of the target wireless terminal, and uses {B, C, D, E} as unsent frames of the target wireless terminal.

If the frames of the target wireless terminal that are stored in the AP 1 are arranged in a form of a frame queue, optionally, the frame queue may be divided into a hardware queue and a software queue. A frame in the software queue is in a buffered state, and a frame in the hardware queue is to be sent or is being sent in a radio frequency chip. The AP 1 may directly use the frame in the software queue as the unsent frame of the target wireless terminal, and send frames in the hardware queue to the target wireless terminal in sequence. If it is detected that sending of a frame in the hardware queue fails, the AP 1 uses a remaining frame in the hardware queue and the frame in the software queue as unsent frames of the target wireless terminal.

The AP 1 may directly send the context handover request to the AP 2, for example, when the AP 1 and the AP 2 are connected in a network. Optionally, the context handover request reaches the AP 2 through the central access point after being sent by the AP 1. For example, when the AP 1 and the AP 2 are disconnected in the network, the AP 1 may send the context handover request to the central access point and the central access point sends the context handover request to the AP 2. FIG. 2A and FIG. 2B show only a case in which the AP 1 directly communicates with the AP 2, and a case in which forwarding is performed by using the central access point is omitted.

Optionally, if the unsent frames of the target wireless terminal exceed a third threshold, the AP 1 may send multiple context handover requests to the AP 2 till the unsent frames of the target wireless terminal are sent, and the context handover requests include different unsent frames of the target wireless terminal.

Optionally, the context handover request may further include a virtual basic service set identifier (BSSID), a user key, and the like of the target wireless terminal.

The central access point may generate multiple virtual BSSIDs. After the target wireless terminal accesses any distributed access point of the central access point, the central access point specifies a virtual BSSID for the target wireless terminal. The central access point may generate multiple virtual BSSIDs in advance, and specify one of the virtual BSSIDs for the target wireless terminal after the target wireless terminal accesses any distributed access point. Alternatively, the central access point may not generate a virtual BSSID in advance, but after the target wireless terminal accesses any distributed access point, generate a virtual BSSID and specify the virtual BSSID for the target wireless terminal. When the target wireless terminal is handed over within a range of the central access point (that is, a range of all distributed access points of the central access point), the virtual BSSID keeps unchanged. That is, when sending a WLAN frame to the target wireless terminal, each distributed access point of the central access point fills the virtual BSSID in a field that is in the WLAN frame and in which a MAC address of the access point needs to be filled, for example, a sender address field and a BSSID field. Therefore, when the target wireless terminal is in the range of the central access point, the target wireless terminal considers that the target wireless terminal is communicating with an access point whose BSSID is the virtual BSSID. The address of the target wireless terminal is used to notify the AP 2 that the target wireless terminal is to move to the coverage area of the AP 2. The user key of the target wireless terminal is data that is related to encryption and decryption and used when the target wireless terminal communicates with the AP 1.

S212. The AP 2 receives the context handover request.

If the AP 1 sends multiple context handover requests, correspondingly, the AP 2 may receive the multiple context handover requests. When receiving the context handover request, the AP 2 creates a context for the target wireless terminal, and the context is used to record data associated with the target wireless terminal, for example, the address of the target wireless terminal and the corresponding virtual BSSID. If the context handover request further includes the user key of the target wireless terminal, the AP 2 further configures the user key on an encryption and decryption module of the AP 2 when receiving the context handover request.

S213. The AP 2 sends the unsent frame to the target wireless terminal.

If the AP 1 sends multiple context handover requests, each time a context handover request is received, the AP 2 may extract an unsent frame in the context handover request and send the unsent frame to the target wireless terminal. Alternatively, the AP 2 may send, only after extracting unsent frames in all the context handover requests, the extracted unsent frames to the target wireless terminal.

S214. Optionally, the AP 2 sends a context handover acknowledgment to the AP 1.

If the AP 1 sends multiple context handover requests to the AP 2, the AP 2 may send a context handover acknowledgment for each context handover request, or the AP 2 may reply with one context handover acknowledgment for all the context handover requests.

Steps S213 and S214 are not performed in a strict sequence and may be performed simultaneously.

S215. Optionally, the AP 1 receives the context handover acknowledgment.

S216. Optionally, the AP 1 sends a handover acknowledgment to the central access point in response to the context handover acknowledgment.

The handover acknowledgment is used to instruct the central access point to start to send the stored second Ethernet frame of the target wireless terminal to the AP 2. The AP 1 may alternatively send the handover acknowledgment to the central access point at any moment after receiving the handover request.

If the AP 1 sends multiple context handover requests to the AP 2, the AP 1 may send the handover acknowledgment to the central access point only after receiving the last context handover acknowledgment, or the AP 1 may send the handover acknowledgment to the central access point when receiving the first context handover acknowledgment.

S217. Optionally, the central access point receives the handover acknowledgment.

S218. The central access point sends the second Ethernet frame of the target wireless terminal to the AP 2.

In this embodiment, the central access point sends the second Ethernet frame of the target wireless terminal to the AP 2 only after receiving the handover acknowledgment, so as to reduce out-of-order of downlink packets. Alternatively, the central access point may send the second Ethernet frame of the target wireless terminal to the AP 2 when determining that the target wireless terminal is handed over from the AP 1 to the AP 2.

For a processing procedure after the AP 2 receives the second Ethernet frame, reference may be made to the foregoing related description after the AP 1 receives the first Ethernet frame sent by the central AP, and details are not described herein.

In the embodiment shown in FIG. 2A and FIG. 2B, in a process in which a target wireless terminal moves from a coverage area of an AP 1 to a coverage area of an AP 2, the AP 1 may send, to the AP 2, a buffered frame that is that fails to be sent to the target wireless terminal in time, and send the frame to the target wireless terminal by using the AP 2, so as to reduce a downlink packet loss when the target wireless terminal is handed over between the AP 1 and the AP 2.

Figure 4:
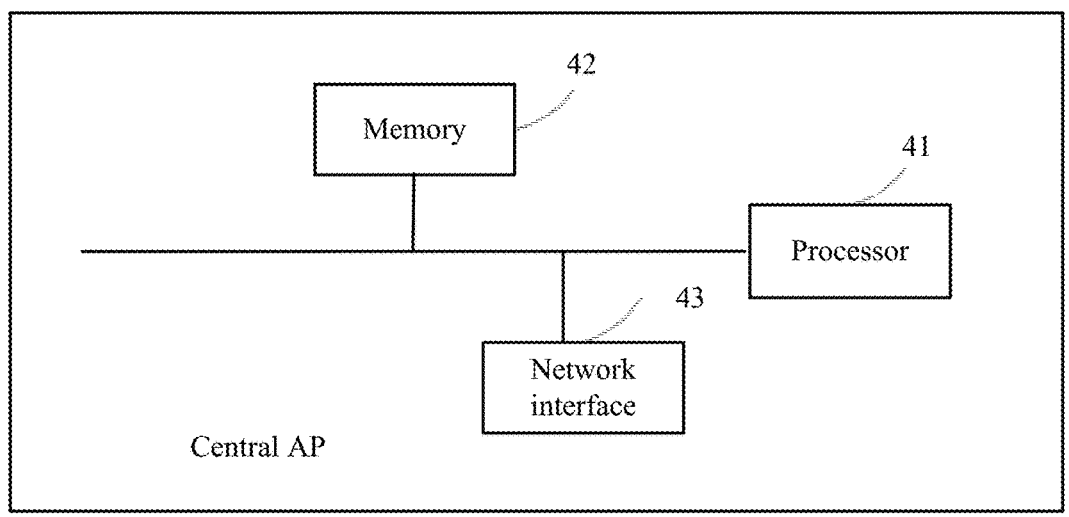
FIG. 4 is a schematic structural diagram of a central access point according to an embodiment of the present invention.

Referring to FIG. 4, FIG. 4 is a schematic structural diagram of a central access point according to an embodiment of the present invention. As shown in FIG. 4, the central access point includes a processor 41, a memory 42, and a network interface 43. The processor 41 is connected to the memory 42 and the network interface 43. For example, the processor 41 may be connected to the memory 42 and the network interface 43 by using a bus.

The processor 41 is configured to support the central access point in performing a corresponding function in the foregoing method. The processor 41 may be a central processing unit (CPU), a network processor (NP), a hardware chip, or any combination thereof. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), generic array logic (GAL), or any combination thereof.

The memory 42 is configured to store a handover condition, an unsent frame of a wireless terminal, and the like. The memory 42 may include a volatile memory, for example, a random access memory (RAM). The memory 42 may also include a non-volatile memory, for example, a read-only memory (ROM), a flash memory, a hard disk drive (HDD), or a solid state drive (SSD). Alternatively, the memory 42 may include a combination of the foregoing types of memories.

The network interface 43 includes one or more Ethernet interfaces. If the network interface 43 includes one Ethernet interface, the central access point may be connected to a switching device by using the Ethernet interface. One or more network interfaces of the switching device are connected to a distributed access point in a wired manner to receive/send messages involved in the foregoing methods from/to the distributed access point. A remaining network interface of the switching device is connected to another network device in a wired manner to receive an Ethernet frame sent by the another network device. If the network interface 43 includes multiple Ethernet interfaces, one or more Ethernet interfaces in the multiple Ethernet interfaces are connected to a distributed access point in a wired manner to receive/send messages involved in the foregoing methods from/to the distributed access point. A remaining network interface in the multiple Ethernet interfaces is connected to another network device in a wired manner to receive an Ethernet frame sent by the another network device.

The processor 41 may perform the following operations:

receiving, by using the network interface 43, a first instruction sent by a first distributed access point, where the first instruction includes an address of the wireless terminal, and the first distributed access point is a distributed access point in multiple distributed access points that serves the wireless terminal; decreasing, in response to the first instruction, a rate of sending an Ethernet frame of the first distributed access point, and saving the Ethernet frame to the memory 42; and when determining that the wireless terminal is handed over from the first distributed access point to a second distributed access point, sending the Ethernet frame to the second distributed access point by using the network interface 43, and sending a handover request to the first distributed access point by using the network interface 43, where the handover request includes the address of the wireless terminal and an identifier of the second distributed access point, the handover request is used to instruct the first distributed access point to send the unsent frame of the wireless terminal to the second distributed access point, and the unsent frame is a frame that has not been sent to the wireless terminal among frames of the wireless terminal that are stored in the first distributed access point.

Further, after receiving, by using the network interface 43, a handover acknowledgment sent by the first distributed access point, the processor 41 may further send the Ethernet frame to the second distributed access point by using the network interface 43.

Figure 5:
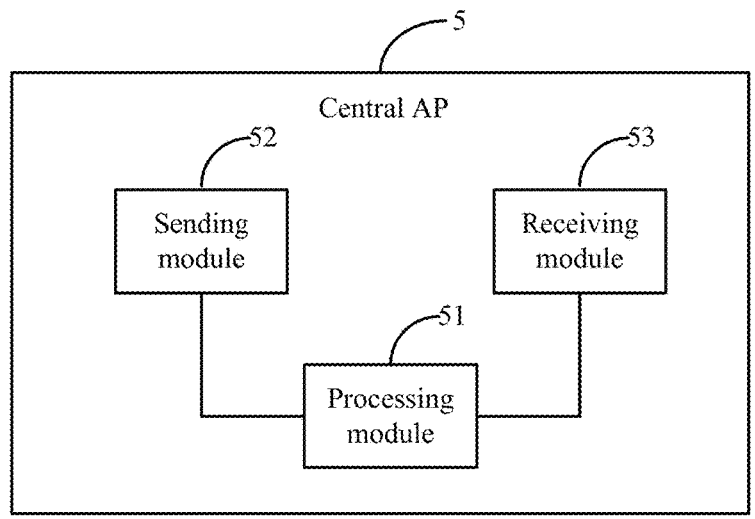
FIG. 5 is a schematic structural diagram of another central access point according to an embodiment of the present invention.

Referring to FIG. 5, FIG. 5 is a schematic structural diagram of another central access point according to an embodiment of the present invention. As shown in FIG. 5, the central access point includes a processing module 51, a sending module 52, and a receiving module 53. The processing module 51 implements a function of the processor shown in FIG. 4. The sending module 52 and the receiving module 53 implement a function of the network interface shown in FIG. 4.

Figure 6:
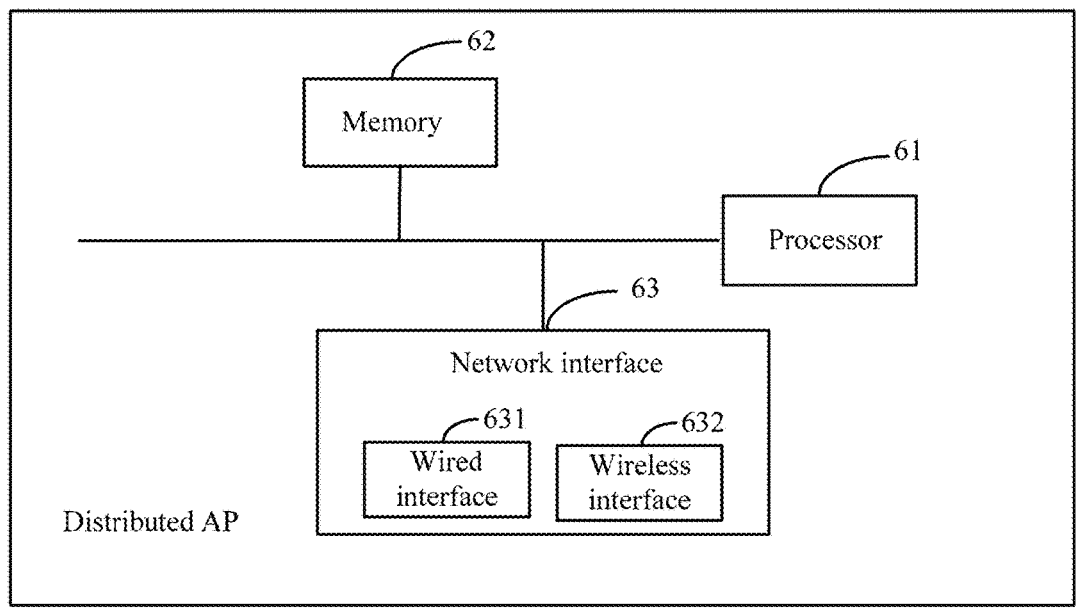
FIG. 6 is a schematic structural diagram of a distributed access point according to an embodiment of the present invention.

Referring to FIG. 6, FIG. 6 is a schematic structural diagram of a distributed access point according to an embodiment of the present invention. As shown in FIG. 6, the distributed access point includes a processor 61, a memory 62, and a network interface 63. The processor 61 is connected to the memory 62 and the network interface 63.

For example, the processor 61 may be connected to the memory 62 and the network interface 63 by using a bus.

The processor 61 is configured to support the distributed access point in performing a corresponding function in the foregoing method. The processor 61 may be a CPU, an NP, a hardware chip, a radio frequency (RF) chip, a baseband chip, or any combination thereof. The foregoing hardware chip may be an ASIC, a PLD, or a combination thereof. The foregoing PLD may be a CPLD, an FPGA, GAL, or any combination thereof.

The network interface 63 includes a wireless interface 632. Optionally, the network interface 63 may further include a wired interface 631. The distributed access point may be connected to a central access point in a wired manner by using the wired interface 631 to receive/send messages involved in the foregoing methods from/to the central access point. Alternatively, the distributed access point may be connected to the central access point by using the wireless interface 632 to receive/send messages involved in the foregoing methods from/to the central access point. The distributed access point performs wireless communication with a wireless terminal by using the wireless interface 632. The wireless interface 632 includes an antenna. The memory 62 may include a volatile memory, for example, a RAM. The memory 62 may also include a non-volatile memory, for example, a ROM, a flash memory, an HDD, or an SSD. Alternatively, the memory 62 may include a combination of the foregoing types of memories.

The processor 61 may perform the following operations:

receiving, by using the network interface 63, a handover request sent by the central access point, where the handover request includes an address of the wireless terminal and an identifier of a second distributed access point; and after receiving the handover request, sending a context handover request to the second distributed access point by using the network interface 63, where the context handover request includes an unsent frame of the wireless terminal, the unsent frame is a frame that has not been sent to the wireless terminal among stored frames of the wireless terminal, and the context handover request is used to instruct the second distributed access point to send the unsent frame to the wireless terminal.

Further, the processor 61 may further receive, by using the network interface, a first Ethernet frame sent by the central access point, where a destination address of the first Ethernet frame is the address of the wireless terminal; save the first Ethernet frame to the memory 62, where the stored frames of the wireless terminal include the first Ethernet frame, or convert the first Ethernet frame into a first radio frame and save the first radio frame to the memory, where the stored frames of the wireless terminal include the first radio frame; and send a first instruction to the central access point by using the network interface 63 when a storage volume is greater than a threshold, where the first instruction includes the address of the wireless terminal, and the first instruction is used to instruct the central access point to decrease a rate of sending an Ethernet frame of the wireless terminal.

Further, the first instruction is further used to instruct the central access point to save a second Ethernet frame whose destination address is the address of the wireless terminal. The processor 61 may further receive, by using the network interface 63, a context handover acknowledgment sent by the second distributed access point, where the context handover acknowledgment is an acknowledgment of the second distributed access point for the context handover request; and send a handover acknowledgment to the central access point by using the network interface 63 in response to the context handover acknowledgment, where the handover acknowledgment is used to instruct the central access point to send the second Ethernet frame stored in the central access point to the second distributed access point.

Further, after receiving, by using the network interface 63, the handover request sent by the central access point, the processor 61 may further preferentially send the stored frames of the wireless terminal to the wireless terminal by using the network interface 63.

Figure 7:
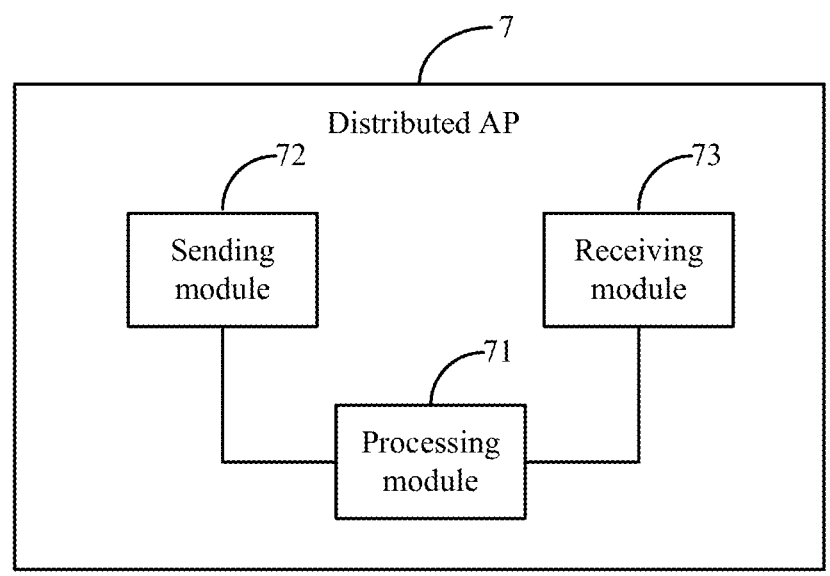
FIG. 7 is a schematic structural diagram of another distributed access point according to an embodiment of the present invention.

Referring to FIG. 7, FIG. 7 is a schematic structural diagram of another distributed access point according to an embodiment of the present invention. As shown in FIG. 7, the distributed access point includes a processing module 71, a sending module 72, and a receiving module 73. The processing module 71 implements a function of the processor shown in FIG. 6. The sending module 72 implements sending interface functions of the wireless interface 632 and the wired interface 631. The receiving module 73 implements receiving interface functions of the wireless interface 632 and the wired interface 631.

A person of ordinary skill in the art may understand that all or some of the procedures of the methods in the embodiments may be implemented by a computer program instructing relevant hardware. The program may be stored in a computer readable storage medium. When the program runs, the procedures of the methods in the embodiments are performed. The storage medium may be a magnetic disk, an optical disk, a ROM or RAM, or the like.

What are disclosed above are merely examples of embodiments of the present invention, and certainly are not intended to limit the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. A method for handover between distributed access points, comprising:
   receiving, by a first distributed access point, a handover request sent by a central access point, wherein the handover request comprises an address of a wireless terminal and an identifier of a second distributed access point;
   sending, by the first distributed access point, a context handover request to the second distributed access point after receiving the handover request, wherein the context handover request comprises an unsent frame of the wireless terminal, the unsent frame is a frame that has not been sent to the wireless terminal among frames of the wireless terminal that are stored in the first distributed access point, and the context handover request is used to instruct the second distributed access point to send the unsent frame to the wireless terminal; and
   sending, by the first distributed access point, a handover acknowledgment to the central access point, wherein the handover acknowledgment is used to instruct the central access point to send a second Ethernet frame stored in the central access point to the second distributed access point;
   wherein the method further comprises:
   receiving, by the first distributed access point, a first Ethernet frame sent by the central access point, wherein a destination address of the first Ethernet frame is the address of the wireless terminal;
   saving, by the first distributed access point, the first Ethernet frame, wherein the frames of the wireless terminal that are stored in the first distributed access point comprise the first Ethernet frame; or converting, by the first distributed access point, the first Ethernet frame into a first radio frame, and saving the first radio frame, wherein the frames of the wireless terminal that are stored in the first distributed access point comprise the first radio frame; and
   sending, by the first distributed access point, a first instruction to the central access point when a storage volume of the first distributed access point is greater than a threshold, wherein the first instruction comprises the address of the wireless terminal, and the first instruction is used to instruct the central access point to decrease a rate of sending an Ethernet frame of the wireless terminal.

2. The method according to claim 1, wherein the first instruction is further used to instruct the central access point to save the second Ethernet frame, wherein a destination address of the second Ethernet frame is the address of the wireless terminal; and
   wherein the method further comprises: receiving, by the first distributed access point, a context handover acknowledgment sent by the second distributed access point, wherein the context handover acknowledgment is an acknowledgment of the second distributed access point for the context handover request; and
   wherein sending the handover acknowledgment to the central access point is in response to the context handover acknowledgment.

3. The method according to claim 1, wherein after receiving the handover request, the method further comprises:
   preferentially sending, by the first distributed access point, the frames of the wireless terminal that are stored in the first distributed access point to the wireless terminal.

4. A method for handover between distributed access points, comprising:
   receiving, by a central access point, a first instruction sent by a first distributed access point, wherein the first instruction comprises an address of a wireless terminal, and the first distributed access point is a distributed access point of multiple distributed access points that serve the wireless terminal;
   decreasing, in response to the first instruction, by the central access point, a rate of sending an Ethernet frame of the first distributed access point, and saving the Ethernet frame; and
   when the wireless terminal is handed over from the first distributed access point to a second distributed access point, sending, by the central access point, the Ethernet frame to the second distributed access point after receiving a handover acknowledgment sent by the first distributed access point, and sending a handover request to the first distributed access point, wherein the handover request comprises the address of the wireless terminal and an identifier of the second distributed access point, the handover request is used to instruct the first distributed access point to send an unsent frame of the wireless terminal to the second distributed access point, and the unsent frame is a frame that has not been sent to the wireless terminal among frames of the wireless terminal that are stored in the first distributed access point.

5. The method according to claim 4, wherein the handover acknowledgment is an acknowledgment for the handover request after the first distributed access point sends the unsent frame of the wireless terminal to the second distributed access point.

6. A distributed access point, comprising:
- a processor;
- a memory; and
- a network interface;
- wherein the processor is connected to the memory and the network interface, and the processor is configured to cooperate with the memory and the network interface to facilitate:
  - receiving, via the network interface, a handover request sent by a central access point, wherein the handover request comprises an address of a wireless terminal and an identifier of a second distributed access point;
  - sending a context handover request to the second distributed access point via the network interface after receiving the handover request, wherein the context handover request comprises an unsent frame of the wireless terminal, the unsent frame is a frame that has not been sent to the wireless terminal among stored frames of the wireless terminal, and the context handover request is for instructing the second distributed access point to send the unsent frame to the wireless terminal; and
  - sending a handover acknowledgment to the central access point via the network interface, wherein the handover acknowledgment is for instructing the central access point to send a second Ethernet frame stored in the central access point to the second distributed access point;
- wherein the processor is further configured to cooperate with the memory and the network interface to facilitate:
  - receiving, via the network interface, a first Ethernet frame sent by the central access point, wherein a destination address of the first Ethernet frame is the address of the wireless terminal;
  - saving the first Ethernet frame to the memory, wherein the stored frames of the wireless terminal comprise the first Ethernet frame; or converting the first Ethernet frame into a first radio frame, and saving the first radio frame to the memory, wherein the stored frames of the wireless terminal comprise the first radio frame; and
  - sending a first instruction to the central access point via the network interface when a storage volume is greater than a threshold, wherein the first instruction comprises the address of the wireless terminal, and the first instruction is for instructing the central access point to decrease a rate of sending an Ethernet frame of the wireless terminal.

7. The distributed access point according to claim 6, wherein the first instruction is further for instructing the central access point to save the second Ethernet frame, wherein a destination address of the second Ethernet frame is the address of the wireless terminal;
- wherein the processor is further configured to cooperate with the memory and the network interface to facilitate:
  - receiving, via the network interface, a context handover acknowledgment sent by the second distributed access point, wherein the context handover acknowledgment is an acknowledgment of the second distributed access point for the context handover request; and
- wherein sending the handover acknowledgment to the central access point via the network interface is in response to the context handover acknowledgment.

8. The distributed access point according to claim 6, wherein the processor is further configured to cooperate with the memory and the network interface to facilitate:
- preferentially sending the stored frames of the wireless terminal to the wireless terminal via the network interface after receiving the handover request sent by the central access point.

9. A central access point, comprising:
- a processor;
- a memory; and
- a network interface;
- wherein the processor is connected to the memory and the network interface, and the processor is configured to cooperate with the memory and the network interface to facilitate:
  - receiving, via the network interface, a first instruction sent by a first distributed access point, wherein the first instruction comprises an address of a wireless terminal, and the first distributed access point is a distributed access point of multiple distributed access points that serve the wireless terminal;
  - decreasing, in response to the first instruction, a rate of sending an Ethernet frame of the first distributed access point, and saving the Ethernet frame; and
  - when the wireless terminal is handed over from the first distributed access point to a second distributed access point, sending the Ethernet frame to the second distributed access point via the network interface after receiving, via the network interface, a handover acknowledgment sent by the first distributed access point, and sending a handover request to the first distributed access point via the network interface, wherein the handover request comprises the address of the wireless terminal and an identifier of the second distributed access point, the handover request is for instructing the first distributed access point to send an unsent frame of the wireless terminal to the second distributed access point, and the unsent frame is a frame that has not been sent to the wireless terminal among frames of the wireless terminal that are stored in the first distributed access point.

10. The central access point according to claim 9, wherein the handover acknowledgment is an acknowledgment for the handover request after the first distributed access point sends the unsent frame of the wireless terminal to the second distributed access point.

\* \* \* \* \*